United States Patent Office 3,743,633
Patented July 3, 1973

3,743,633
Δ$^{4,20,22}$ - BUFATRIENOLIDE RHAMNOSIDE ACYLATES AND METHODS FOR THEIR PREPARATION
Bruno Goerlich, Mannheim, Hugo Kubinyi, Leimen, and Walter Steidle, Limburgerhof, Germany, assignors to Knoll A.G. Chemische Fabriken, Ludwigshafen (Rhine), Germany
No Drawing. Filed Jan. 9, 1970, Ser. No. 1,853
Claims priority, application Germany, Jan. 9, 1969, P 19 00 898.1; May 31, 1969, P 19 27 908.4
Int. Cl. C07c 173/00
U.S. Cl. 260—210.5         11 Claims

ABSTRACT OF THE DISCLOSURE

Defined Δ$^{4,20,22}$-bufatrienolide rhamnoside acylates of the formula

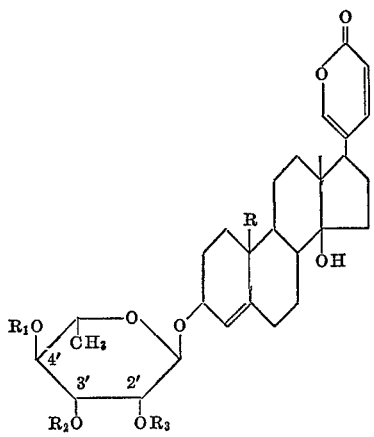

wherein R is methyl or formyl, $R_1$–$R_3$ are hydrogen or acyl, and at least one of $R_1$–$R_3$ is acyl, and method of making the same by acylation of the corresponding hydroxy compounds and separation of any mixed reaction products by column chromatography and/or countercurrent distribution.

---

The present invention relates to Δ$^{4,20,22}$-bufatrienolide rhamnoside acylates and to methods for their preparation.

The value of partially acetylated cardiac glycosides such as acetyl digitoxin, acetyl digoxin, and lanatoside for oral therapy of cardiac insufficiency in humans is generally known.

However, only proscillaridin triacetate [P. Zoller et al., Helv. Chim. Acta 36, 1744 (1953)] and 2′,3′-acetonide-4′-acetate (Netherlands patent application 6717599) have heretofore been prepared in a pure state from proscillaridin.

In addition to the above-mentioned triacetate, South African patent 67/3,363 (U.S. 3,472,836) describes monoacetyl-proscillaridin and diacetyl-proscillaridin, as well as a process for their preparation. However, these prior art acetates are mixtures of all possible isomeric forms of these compounds and vary in amount and composition according to the reaction conditions employed.

According to the present invention, defined (i.e. isomerically homogeneous) Δ$^{4,20,22}$-bufatrienolide rhamnoside acylates of the general formula

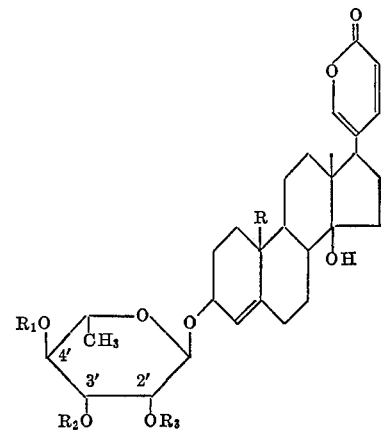

have been prepared, wherein R is methyl or formyl, $R_1$, $R_2$, and $R_3$ are each hydrogen atoms or acyl groups having at least 2 carbon atoms, and at least one of the substituents $R_1$–$R_3$ is such an acyl group. Particularly preferred embodiments are those in which the radicals $R_1$–$R_3$ represent hydrogen atoms or acetyl groups, in which at least one of the substituents $R_1$–$R_3$ is an acetyl group, and in which at most two of the substituents $R_1$–$R_3$ are acetyl groups if R is a methyl group.

The following specific acylates are of particular interest:

proscillaridin-2′-acetate;
proscillaridin-3′-acetate;
proscillaridin-4′-acetate;
proscillaridin-2′,3′-diacetate;
proscillaridin-2′,4′-diacetate;
proscillaridin-3′,4′-diacetate;
19-oxo-proscillaridin-2′-acetate;
19-oxo-proscillaridin-3′-acetate;
19-oxo-proscillaridin-4′-acetate;
19-oxo-proscillaridin-2′,3′-diacetate;
19-oxo-proscillaridin-2′,4′-diacetate;
19-oxo-proscillaridin-3′,4′-diacetate;
19-oxo-proscillaridin-2′,3′,4′-triacetate;
proscillaridin-3′-methoxyacetate;
proscillaridin-3′-propionate;
proscillaridin-3′-butyrate;
proscillaridin-3′-caproate;
proscillaridin-3′-caprate;
proscillaridin-3′-benzoate;
proscillaridin-4′-propionate; and
proscillaridin-4′-benzoate.

The $\Delta^{4,20,22}$-bufatrienolide rhamnoside acylates of the invention are prepared by reacting a $\Delta^{4,20,22}$-bufatrienolide rhamnoside of the general formula

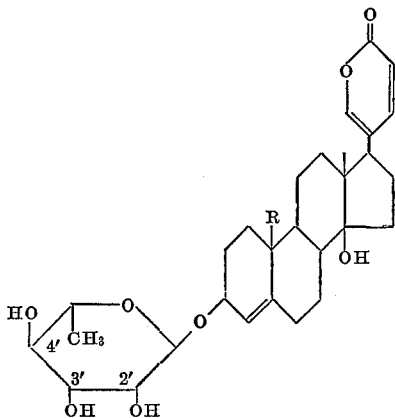

wherein R is methyl or formyl, with a reactive derivative of a carboxylic acid having at least 2 carbon atoms, if desired in the presence of a catalyst. If mixtures are obtained, they are conveniently separated by column chromatography and/or countercurrent distribution. Acid chlorides and acid anhydrides are the preferred reactive carboxylic acid derivatives. Thus, for preparing the particularly preferred $\Delta^{4,20,22}$-bufatrienolide rhamnoside acetates, a bufatrienolide rhamnoside of the formula given above is suitably reacted with acetyl chloride or acetic anhydride in the presence of a catalyst.

To prepare $\Delta^{4,20,22}$-bufatrienolide rhamnoside monoacetates, in which two of the groups $R_1$–$R_3$ are hydrogen and the third is acetyl, the steroid starting compound is reacted with acetic anhydride at temperatures below —25° C. The reaction mixture obtained, containing the desired monoacetate, is separated by column chromatography or by countercurrent distribution (CCD). The reaction can also be carried out using acetic anhydride in dimethyl formamide in the presence of barium carbonate or calcium carbonate as an acid scavenger. Again, the product mixture containing the preferred monoacetate is separated by column chromatography or CCD.

To prepare bufatrienolide rhamnoside diacetates, in which two of the group $R_1$–$R_3$ are acetyl and the third is hydrogen, the steroid starting material is reacted with acetic anhydride at a temperature from —25° C. to 0° C. The reaction mixture obtained, containing the desired diacetate, is separated by column chromatography and/or CCD.

To prepare bufatrionolide rhamnoside-3'-acylates, in which $R_1$ and $R_3$ are hydrogen and $R_2$ is acyl having at least 2 carbon atoms, the acylation reaction is carried out using pyridine as an organic catalyst and in the presence of a boron-containing complexing agent, particularly meta- or ortho-boric acid.

To prepare the corresponding 4'-acylates, in which $R_2$ and $R_3$ are hydrogen and $R_1$ is acyl, steroid starting materials are used the 2'- and 3'-hydroxy groups of which are first blocked by ketal formation. The —OH groups are regenerated after acylation by treatment with dilute acid.

By "reactive derivatives of carboxylic acids having at least 2 carbon atoms" are meant particularly those compounds which are derived from lower members of the fatty acid series, e.g. from acetic acid, propionic acid, butyric acid, caproic acid or capric acid, as well as compounds such as methoxyacetic acid and benzoic acid. Acid anhydrides and acid halides are of particular interest.

As catalysts for the reactions of the invention, pyridine or boron trifluoride etherate are particularly suitable.

The reaction is preferably carried out in an inert organic solvent such as tetrahydrofuran, dioxane, or acetone. However, dimethylformamide or pyridine in excess of that used as a catalyst can also be employed.

The techniques employed to separate the compounds prepared according to the invention are known in the art. Column chromatography is principally adaptable to separating mixtures of diacylates and monoacylates, as well as for removing any triacylate which may be formed. The mixtures of diacylates or monoacylates can be separated by CCD, as described, for example, in L. C. Craig et al., "Laboratory Extraction and Countercurrent Distribution," in A. Weissberger, ed., "Separation and Purification" (vol. III, Part I of Technique of Organic Chemistry, 2d ed., Interscience Publishers Inc., New York, 1956, p. 149). See also "Countercurrent Distribution" in Encyclopedia of Industrial Chemical Analysis, vol. I, ed. Foster Dee Snell et al., Interscience Publishers Inc., New York, 1966, p. 506.

To summarize: The reaction of proscillaridin or of 19-oxo-proscillaridin with a mixture of acetic anhydride/boron trifluoride in tetrahydrofuran produces a mixture of all possible acetates. However, by suitable choice of the reaction conditions the monoacetate (1 hour at —35° C.) or the diacetate (1 hour at —15° C.) can be made to predominate.

The reaction of proscillaridin or of 19-oxo-proscillaridin with acetic anhydride in pyridine or with acetyl chloride in pyridine also leads to mono- and di-acetates. However, the reaction takes place with less specificity. The reaction of proscillaridin or of 19-oxo-proscillaridin with acetic anhydride in dimethyl formamide in the presence of barium carbonate or calcium carbonate, in contrast, specifically produces a mixture of monoacetates in surprisingly high yields.

Pure proscillaridin-4'-monoacetate or 19-oxo-proscillaridin-4'-monoacetate can also be obtained by acid cleavage of proscillaridin-2',3'-acetonide-4'-acetate or of the corresponding 19-oxo-compound.

Column chromatography of the acetate mixtures which are obtained by the partial acetylation of proscillaridin or 19-oxo-proscillaridin yields the corresponding 2',3'-diacetates as well as mixtures of 2',4'-diacetates and of 3',4'-diacetates and mixtures of 2'-acetates, 3'-acetates, and 4'-acetates, in addition to a small amount of the 2',3',4'-triacetates. The mixtures of 2',4'-diacetates and 3',4'-diacetates, as well as of the monoacetates, can be separated by CCD.

The reaction of proscillaridin or 19-oxo-proscillaridin with acid anhydrides in an inert solvent such as acetone, tetrahyodrofuran, or dioxane, in the presence of boric acid as a complexing agent and of pyridine as a catalyst, favors formation of 3'-acylates. The crude products obtained are pure and can be directly crystallized from a suitable solvent, e.g. ethyl acetate. If by-products such as starting materials or higher esters are present, the crude product can be purified by column chromatography prior to recrystallization.

It must be concluded that activation of the 3'-hydroxyl group occurs by formation of a cyclic boric acid complex in which 2'- and 3'-hydroxyl groups take part. At too-high concentrations of acylating agent or pyridine, further estrification to form di- and tri-acylates occurs.

To prepare 4'-acylates of procillaridin or 19-oxo-proscillaridin, steroid starting compounds having 2'- and 3'-hydroxy groups protected by ketal formation are used as starting compounds. After acylation, the 2'- and 3'-hydroxy groups are regenerated with mineral acid, e.g. with dilute HCl in tetrahydrofuran.

Ketal formation is disclosed in commonly-owned co-pending patent application Ser. No. 656,356, filed July 27, 1967, now Pat. No. 3,546,208. As there taught, proscillaridin or 19-oxo-proscillaridin is reacted with a dialkyl ketone such as acetone, diethyl ketone, or dibutyl ketone, or with a cyclic ketone such as cyclohexanone, at room temperature or at an elevated temperature up to about the boiling point of the ketone reactant at a pH below 7, i.e. in the presence of a mineral or organic acid, or in the presence of a salt of a weak base and a strong acid, e.g. a Friedel-Crafts salt such as cupric sulfate or zinc chloride.

The structure of the proscillaridin and 19-oxo-proscillaridin acylates has been determined by nuclear magnetic resonance spectroscopy, treatment with sodium periodate, and by the formation of acetonides.

Following Tables 1–3 summarize the $R_f$-values of various proscillaridin acylates, and Tables 4 and 5 give nuclear magnetic resonance data. The nuclear magnetic resonance data for the hydrogen atoms $H'_1$–$H'_6$ of 19-oxo-proscillaridin acetates are practically no different from the data for the proscillaridin acetates. However, the signal for the hydrogen atom in the 19-position appears in the spectrum of the 19-oxo-proscillaridin acetates at about 9.9 p.p.m.

In Tables 4 and 5, the δ-values are given in p.p.m. ($δ_{TMS}$=0.00 p.p.m.) and the J-values are given in cycles per second. The following abbreviations are employed: s=singlet; d=doublet; t=triplet; q=quadruplet; m=multiplet. The spectra were measured in $CDCl_3$.

TABLE 1
$R_f$-values of proscillaridin acetates

| Proscillaridin acetate | Ethyl acetate | Chloroform/ acetone 4:1 | Chloroform/ ethyl acetate 4:1 |
|---|---|---|---|
| 2'-acetate | 0.59 | 0.10 | |
| 3'-acetate | 0.58 | 0.10 | |
| 4'-acetate | 0.65 | 0.10 | |
| 2',3'-diacetate | 0.88 | 0.60 | |
| 2',4'-diacetate | 0.86 | 0.50 | |
| 3',4'-diacetate | 0.86 | 0.45 | |
| 2',3',4'-triacetate | 0.97 | 0.83 | 0.40 |

TABLE 2
$R_f$-values of 19-oxo-proscillaridin acetates

| 19-oxo-proscillaridin acetate | Ethyl acetate | Chloroform/ acetone 4:1 | Chloroform/ ethyl acetate 4:1 |
|---|---|---|---|
| 2'-acetate | 0.40 | 0.04 | |
| 3'-acetate | 0.40 | 0.04 | |
| 4'-acetate | 0.43 | 0.04 | |
| 2',3'-diacetate | 0.80 | 0.35 | |
| 2',4'-diacetate | 0.73 | 0.28 | |
| 3',4'-diacetate | 0.73 | 0.28 | |
| 2',3',4'-triacetate | 0.92 | 0.67 | 0.20 |

TABLE 3
$R_f$-values of proscillaridin acylates

| Proscillaridin acylate | Chloroform/ ethyl acetate 1:2 (without chamber saturation) | Ethyl acetate (without chamber saturation) |
|---|---|---|
| 3'-methoxy acetate | 0.10 | |
| 3'-propionate | 0.28 | 0.66 |
| 3'-butyrate | 0.44 | 0.76 |
| 3'-caproate | 0.62 | 0.88 |
| 3'-caprate | 0.73 | 0.94 |
| 3'-benzoate | 0.62 | 0.89 |
| 4'-propionate | 0.19 | 0.77 |
| 4'-benzoate | 0.32 | 0.88 |

TABLE 4
Nuclear magnetic resonance data for proscillaridin acetates

| | 2'-acetate | 3'-acetate | 4'-acetate |
|---|---|---|---|
| H-1' | 4.93 (br.s) | 4.95 (d) ($J_{1'2'}$=2) | 4.98 (br.s) |
| H-2' | 5.08 (q) ($J_{1'2'}$~1) ($J_{2'3'}$=3) | 4.08 (q,$J_{1'2'}$=2) ($J_{2'3'}$=3) | ~3.9 (m) |
| H-3' | 4.0 (q) ($J_{2'3'}$=3) ($J_{3'4'}$=10) | 4.98 (q,$J_{2'3'}$=3) ($J_{3'4'}$=9.5) | ~3.9 (m) |
| H-4' | ~3.5 (m) | ~3.8 (m) ($J_{3'4'}$=9) | 4.90 (t) ($J_{3'4'}$=10) ($J_{4'5'}$=10) |
| H-5' | ~3.4-3.7 (m) | ~3.6-3.9 (m) | ~3.7-4.0 (m) |
| H-6' | 1.33 (d,$J_{5'6'}$=6) | 1.35 (d,$J_{5'6'}$=6) | 1.19 (d) ($J_{5'6'}$=6.5) |
| H-18 | 0.74 (s) | 0.74 (s) | 0.75 (s) |
| H-19 | 1.06 (s) | 1.06 (s) | 1.07 (s) |
| —OAc | 2.15 (s) | 2.18 (s) | 2.13 (s) |

| | 2',3'-diacetate | 2',4'-diacetate |
|---|---|---|
| H-1' | 4.94 (br.s) | 4.97 (d,$J_{1'2'}$=1) |
| H-2' | ~5.3 AB-d ($J_{2'3'}$=3.5) | 5.03 (q,$J_{1'2'}$=1.5) ($J_{2'3'}$=3.5) |
| H-3' | ~5.2 AB-q ($J_{2'3'}$=3.5) ($J_{3'4'}$=7) | 4.11 (m) |
| H-4' | 3.4-3.9 (complex system) | 4.86 (t,$J_{3'4'}$=10) ($J_{4'5'}$=10) |
| H-5' | | ~3.9 (m) |
| H-6' | 1.36 (d,$J_{5'6'}$=6) | 1.22 (d,$J_{5'6'}$=6) |
| H-18 | 0.75 (s) | 0.74 (s) |
| H-19 | 1.06 (s) | 1.06 (s) |
| —OAc | 2.08, 2.15 (s) | 2.12, 2.16 (s) |

| | 3',4'-diacetate | 2',3',4'-triacetate |
|---|---|---|
| H-1' | 4.98 (d) ($J_{1'2'}$=1.5) | 4.92 (d) ($J_{1'2'}$=1) |
| H-2' | 4.03 (q,$J_{1'2'}$=1) ($J_{2'3'}$=3) | |
| H-3' | ~5.25 AB-d ($J_{2'3'}$=3) | 5.1-5.3 (complex system) |
| H-4' | ~5.1 AB-d ($J_{4'5'}$=9) | |
| H-5' | ~4.0 (m) | ~4.0-4.1 (m) |
| H-6' | 1.21 (d) ($J_{5'6'}$=6) | 1.22 (d) ($J_{5'6'}$=6.5) |
| H-18 | 0.75 (s) | 0.75 (s) |
| H-19 | 1.06 (s) | 1.07 (s) |
| —OAc | 2.03, 2.07 (s) | 1.99, 2.05, 2.16 (s) |

TABLE 5

Nuclear Magnetic Resonance Data for Proscillaridin Acylates

| | 3'-methoxyacetate | 3'-propionate | 3'-butyrate |
|---|---|---|---|
| H-1' | 4.96 (d; J=2) | 4.93 (br.) | 4.94 (d; J=2) |
| H-2' | ca. 4.1 (not assignable) | 4.00 (q; $J_1$=2, $J_2$=3) | 4.01 (q; $J_1$=2, $J_2$=3) |
| H-3' | ca. 5.1 (m) | 5.05 (q; $J_1$=3, $J_2$=10) | 5.08 (q; $J_1$=3, $J_2$=9) |
| H-4' H-5' | }3.4-4.2 (complex system) | 3.5-4.0 (complex system) | 3.5-3.9 (complex system) |
| H-6' | 1.32 (d; J=6.5) | 1.33 (d; J=6) | 1.33 (d; J=6) |
| H-18 | 0.74 (s) | 0.74 (s) | 0.74 (s) |
| H-19 | 1.05 (s) | 1.05 (s) | 1.05 (s) |
| —OC—R (∥O) | 3.48 (s), 4.15 (s) | 1.15 (t; J=7), ca. 2.3 (m) | 0.97 (t; J=7), ca. 1.7 (m), 2.40 (t; J=7) |

| | 3'-caproate | 3'-caprate | 3'-benzoate |
|---|---|---|---|
| H-1' | 4.95 (d; J=2) | 4.91 (d; J=2) | 4.97 (d; J=2) |
| H-2' | 4.02 (m) | 4.00 (m) | 4.15 (m) |
| H-3' | 5.08 (q; $J_1$=3.5, $J_2$=10) | 5.05 (q; $J_1$=3.5, $J_2$=10) | 5.29 (q; $J_1$=3.5, $J_2$=10) |
| H-4' H-5' | }3.4-4.0 (complex system) | 3.5-4.0 (complex system) | 3.7-4.2 (complex system) |
| H-6' | 1.32 (partially obscured) | 1.33 (partially obscured) | 1.36 (d; J=6) |
| H-18 | 0.74 (s) | 0.74 (s) | 0.75 (s) |
| H-19 | 1.05 (s) | 1.05 (s) | 1.07 (s) |
| —OC—R (∥O) | 0.90 (asym. t; J=7), 1.2-2.0 (m), 2.42 (t; J=7) | 0.89 (asym. t; J=7), 1.28 (s), 2.41 (t; J=7) | 7.5-8.3 (m) |

| | 4'-propionate | 4'-benzoate |
|---|---|---|
| H-1' | 4.98 (s) | 5.02 (s) |
| H-2' H-3' | }3.8-4.1 (complex system) | 3.9-4.2 (complex system) |
| H-4' | 4.92 (t; $J_1$=$J_2$=10) | 5.18 (t; $J_1$=$J_2$=10) |
| H-5' | 3.8-4.2 (not assignable) | 3.9-4.3 (not assignable) |
| H-6' | 1.18 (d; J=6) | 1.24 (d; J=6) |
| H-18 | 0.74 (s) | 0.74 (s) |
| H-19 | 1.06 (s) | 1.05 (s) |
| —OC—R (∥O) | 1.17 (t; J=7), 2.40 (q; J=7) | 7.4-8.2 (m) |

The compounds of the invention are used in therapy for treatment of cardiac insufficiency. Because they show an increased oral efficacy, their dosage is easily controlled.

It has been found particularly desirable to treat cardiac insufficiency by oral administration of therapeutic dosage units in tablet, capsule or liquid form containing from about 0.10 to about 0.5 mg. of a product according to the present invention, the remainder being a pharmaceutically acceptable, physically innocuous, solid or liquid carrier material.

As solid carriers suitable for the manufacture of useful pharmaceutical preparations, various inert pulverulent distributing agents conventionally used in pharmaceutical compounding may be employed.

When preparing tablets, pills, powders, and the like, the commonly used diluting agents may be added, such as sugar, lactose, talcum, starch, calcium phosphate and pectins. As binders, gelatin, gum arabic, methyl cellulose, yeast extract, agar, and tragacanth may be used, and, as lubricating agents, magnesium stearate, stearic acid, and others.

As liquid carriers suitable for the manufacture of useful pharmaceutical preparations, the well known solvents, diluents or solubilizers such as glycerine, propylene glycol, polyethylene glycol, or some other semipolar solvent may be used. A pharmaceutically acceptable liquid preparation may be obtained by dissolving a product according to the present invention in 40 to 50% aqueous ethanol solution. Common taste improving agents may be added.

Due to varying contents of isomers undefined mixtures known in the prior art are of different efficacy in that the isomers show diverse activity as to be seen from Table 6 below. On the contrary the compounds of the invention are easily controllable and consequently superior with respect to their safety and reliability in therapy.

As evidence of the cardiac efficacy of the compounds, the minimal titer and enteral resorption of the compounds were measured on guinea pigs [method of Knaffl-Lenz, Pharm. Exp. Ther. 29, 407 (1926)] and cats [method of Hatcher et al., Am. J. Pharm. 82, 360 (1910)]. Enteral resorption was measured by the method of Neumann [Naunyn-Schmiedeberg's Arch. exp. Path. u. Pharmakol. 208, 87 (1949)]. The results are presented in Table 6 below.

Surprisingly, the defined (i.e. isomerically homogeneous) products of the present invention have a greater efficacy, for example as measured by their resorption, than do the mixtures of isomers of the same compounds known in the prior art.

TABLE 6

| | Minimal titer, intravenous | | Enteral resorption cats (percent) |
|---|---|---|---|
| Proscillaridin acylate | Guinea pigs (mg./kg.) | Cats (mg./kg.) | |
| 2'-acetate | 0.51 | 0.15 | 38 |
| 3'-acetate | 0.42 | 0.15 | 91 |
| 4'-acetate | 0.44 | 0.16 | 70 |
| 2',4'-diacetate | 1.61 | 0.47 | 90 |
| 19-oxo-4'-acetate | 0.78 | 0.20 | 47 |
| 3'-methoxyacetate | 0.89 | | |
| 3'-propionate | 0.34 | | |
| 4'-propionate | 0.52 | | |
| Proscillaridin | 0.45 | 0.21 | 34 |
| Proscillaridin-2',3',4'-triacetate | 3.50 | | |

A better understanding of the present invention and of its many advantages will be had by referring to the following specific examples given by way of illustration.

EXAMPLE 1

A cooled solution of 5 ml. of boron trifluoride-etherate in 50 ml. of acetic anhydride was added at −35° C. to a solution of 5 g. of proscillaridin in 100 ml. of tetrahydrofuran. After 1 hour stirring at −35° C., the reaction mixture was combined with 200 ml. of cold methanol and left to stand for 60 minutes until excess acetic anhydride had been completely decomposed.

After the addition of 500 ml. of ethyl acetate, the reaction mixture was first extracted with two 500 ml. portions of 5 percent aqueous sodium hydroxide and then with two 500 ml. portions of water. The organic phase was dried over anhydrous sodium sulfate and evaporated.

The following fractions were obtained by column chromatography on silica gel employing the system chloroform/acetone=3:1:

Fraction 1: 0.33 g. proscillaridin-triacetate (5 percent of theory)
Fraction 2: 1.01 g. proscillaridin-diacetate mixture (17 percent of theory)
Fraction 3: 3.83 g. proscillaridin-monoacetate mixture (71 percent of theory)

Recrystallization of Fraction 3 from ethyl acetate gave 1.63 g. of pure proscillaridin-3'-acetate (30 percent of theory) having M.P. 230° C.–236° C.

In similar fashion employing 19-oxo-proscillaridin, 19-oxo-proscillaridin-triacetate and mixtures of 19-oxo-proscillaridin-diacetate and of 19-oxo-proscillaridin monoacetates were obtained after column chromatography on silica gel.

EXAMPLE 2

A cooled solution of 20 ml. of boron trifluoride etherate in 200 ml. of acetic anhydride was added at −15° C. to a solution of 20 grams of proscillaridin in 200 ml. of tetrahydrofuran. After stirring for one hour at −15° C., 500 ml. of cold methanol were added and the reaction mixture was worked up as described in Example 1.

From four batches, each of 20 g. of proscillaridin, the following fractions were obtained after column chromatography on silica gel with chloroform/ethyl acetate=4:1 and subsequent chromatography of the mixed fractions:

Fraction 1=24.6 g. proscillaridin-triacetate (25 percent of theory) amorphous;
Fraction 2=19.3 g. proscillaridin-2',3'-diacetate (21 percent of theory) amorphous;
Fraction 3=19.6 g. of a mixture of proscillaridin-2'4'-diacetate and proscillaridin-3',4'-diacetate (21 percent of theory); and
Fraction 4=22.5 g. of a mixture of proscillaridin-monoacetates (26 percent of theory).

EXAMPLE 3

2 g. of proscillaridin were dissolved in 20 ml. of absolute pyridine, combined wtih 2 ml. of acetic anhydride and stirred for one hour at 20° C. Thereafter, 5 ml. of cold methanol were added to the reaction solution. After decomposition of excess anhydride and after addition of 50 ml. of ethyl acetate, the mixture was extracted with two 50 ml. portions of 5 percent aqueous hydrochloric acid and then with two 50 ml. portions of 5 percent sodium hydroxide solution.

After washing the organic phase with two 50 ml. portions of water and drying over anhydrous sodium sulfate, the solvent was distilled off in vacuum.

Column chromatography on silica gel with chloroform/acetone=4:1 gave:

0.75 g. of a mixture of proscillaridin-diacetates (32 percent of theory); and
1.30 g. of a mixture of proscillaridin-monoacetates (60 percent of theory).

If the reactants are reacted for two hours at 20° C., the following are obtained after being worked up and chromatographed as above:

1.15 g. of a mixture of proscillaridin diacetates (50 percent of theory);
0.90 g. of a mixture of proscillaridin monoacetates (41 percent of theory).

In the same manner as described for proscillaridin, the reaction of 19-oxo-proscillaridin produces a mixture of 19-oxo-proscillaridin diacetates and a mixture of 19-oxo-proscillaridin monoacetates.

EXAMPLE 4

5 grams of proscillaridin were dissolved in 100 ml. of dimethyl formamide and stirred for 15 hours at 20° C. with 20 ml. of acetic anhydride and 20 g. of barium carbonate. After filtration, the material was worked up as described in Example 3. After chromatography on silica gel with chloroform:acetone=3:1, the following fractions were obtained:

Fraction 1: 0.10 g. proscillaridin-triacetate (2 percent of theory);
Fraction 2: 0.57 g. of a mixture of proscillaridin-diacetates (10 percent of theory);
Fraction 3: 4.54 g. of a mixture of proscillaridin-monoacetates (84 percent of theory).

In an analogous fashion, 19-oxo-proscillaridin-triacetate, a mixture of 19-oxo-proscillaridin-diacetates, and a mixture of 19-oxo-proscillaridin monoacetates were obtained from 19-oxo-proscillaridin.

EXAMPLE 5

15.92 g. of a mixture of proscillaridin-2',4'-diacetate and proscillaridin-3',4'-diacetate (obtained according to Example 2) were separated by countercurrent distribution in a distribution train using 2000 transfers with the system carbon tetrachloride:chloroform:methanol:water=3:1:3:1 (tube no.=1020, V=10/10 ml., T=20° C., material dissolved in the first ten tubes; after 1020 transfers in the basic process, the method of upper phase removal was employed).

The following were obtained:

in tubes 676–823, 7.01 g. of proscillaridin-2',4'-diacetate, amorphous;
in tubes 824–971, 5.65 g. of proscillaridin-3',4'-diacetate, amorphous.

A corresponding mixture of 19-oxo-proscillaridin-diacetates can be separated in a similar fashion.

EXAMPLE 6

15.70 g. of a mixture of proscillaridine-monoacetates were separated by countercurrent distribution in a distribution train using 1850 transfers with the system carbon tetrachloride:chloroform:methanol:water=2:2:3:1 (tube no.=1020, V=10/10 ml., T=20° C., the material is dissolved in the first ten tubes, after 1020 transfers in the basic process, the method of upper phase removal was employed).

The following were obtained:

in tubes 652–699, 2.94 g. of proscillaridin-4'-acetate, M.P. 230° C.–234° C.;
in tubes 700–747, 2.94 g. of a mixture of proscillaridin-monoacetates;
in tubes 748–843, 4.15 g. of proscillaridin-2'-acetate, M.P.=233° C.–237° C.;
in tubes 884–1007, 4.10 g. of proscillaridin-3'-acetate, M.P.=236°–238° C.

Mixtures of the corresponding 19-oxo-proscillaridin-monoacetates can be separated in analogous fashion.

EXAMPLE 7

5 g. of proscillaridin were boiled briefly wtih 1 g. of metaboric acid in 250 ml. of acetone until all the proscillaridin dissolved. The clear solution was cooled, combined with 10 ml. of acetic anhydride and 10 ml. of pyridine, and left to stand for two hours at 20° C. The batch was then combined with 500 ml. of ethyl acetate and shaken twice with 5 percent aqueous hydrochloric acid, twice with 5 percent aqueous sodium hydroxide, and twice with water. The organic phase was then dried with anhydrous sodium sulfate and evaporated. After crystallization from 25 ml. ethyl acetate, the crude product obtained gave 4.95 g. of crystallized proscillaridin-3'-acetate (92 percent of theory) having an $R_f$ value=0.17 in chloroform:ethyl acetate=1:2. Recrystallization from ethyl acetate gave an analytically pure product, M.P. 240° C.–242° C.

Dioxane or tetrahydrofuran can be used as a solvent in place of acetone. Propionic acid anhydride, butyric acid anhydride, caproic or capric acid anhydrides, benzoic acid anhydride, the corresponding acid chlorides, or methoxy acetic acid chloride can be used in place of acetic anhydride. Ortho-boric acid can be used instead of meta-boric acid. A summary of the yields obtained under differing conditions of acylation is given in Table 7.

By an analogous process starting with 19-oxo-proscillaridin, 19-oxo-proscillaridin-3'-acetate is obtained. $R_f$-value=0.10 in chloroform:ethyl acetate=1:2; M.P. =240°–246° C. (decomp.).

TABLE 7

Yields obtained in the 3'-Acylation of proscillaridin

| Product | Reaction conditions | | | | Product yield (percent of theory) | |
|---|---|---|---|---|---|---|
| | Acylation agent | Complexing agent | Solvent | Time (hours) | Crude | Crystallized |
| 3'-acetate | I | m | A | 2 | | 92 |
| Do | I | o | A | 2 | | 79 |
| Do | I | m | D | 5 | | 84 |
| Do | I | o | D | 5 | | 83 |
| Do | I | m | THF | 5 | | 77 |
| Do | I | o | THF | 5 | | 86 |
| Do | II | m | A | 2 | 65 | 35 |
| 3'-methoxyacetate | II | m | A | 3 | 50 | |
| 3'-propionate | I | m | A | 2 | 95 | 62 |
| Do | II | m | A | 3 | 58 | 32 |
| 3'-butyrate | I | m | A | 6 | | 72 |
| 3'-caproate | I | m | A | 8 | 77 | 51 |
| 3'-caprate | I | m | A | 16 | 68 | 50 |
| 3'-benzoate | I | m | A | 60 | 69 | 62 |
| Do | II | m | A | 2½ | 65 | 53 |

NOTE.—I=Acid anhydride; II=Acid chloride; THF=Tetrahydrofuran; A=Acetone; D=Dioxane; m=meta-boric acid, $HBO_2$; o=ortho-boric acid, $H_3BO_3$.

EXAMPLE 8

10 grams of proscillaridin-2',3'-acetonide-4'-propionate (obtained by reacting 11.2 g. of proscillaridin with 500 ml. of 0.01 HCl/acetone at 20° C. and esterifying the 9.8 g. of proscillaridin-2',3'-acetonide so obtained with 20 ml. of propionic acid anhydride in 100 ml. of pyridine at 25°–30° C.) were dissolved in 500 ml. of 0.2 N HCl in tetrahdrofuran and left to stand for 7 hours at 20° C. The material was worked up as described in Example 1. After column chromatography on silica gel using the system chloroform/ethyl acetate=2:1 to 1:1 the following were obtained:

4.24 g. proscillaridin-4'-propionate (45 percent of theory) $R_f$-value=0.77 in ethyl acetone:amorphous.

In similar fashion, (a) 7.4 g. of proscillaridin-2',3'-acetonide-4'-acetate were cleaved in 75 ml. of 0.1 N hydrochloric acid in tetrahydrofuran (24 hours at 20° C.). After column chromatography on silica gel with toluene/acetone/gradient elution, the following were obtained:

3.04 g. of proscillaridin-2',3'-acetonide-4'-acetate;
2.71 g. of proscillaridin-4'-acetate (66 percent of theory calculated on the proscillaridin-2',3'-acetonide-4'-acetone reagent) M.P. 228° C.–233° C.;
0.50 g. of proscillaridin.

(b) Starting from 19-oxo-proscillaridin - 2',3' - acetonide-4'-acetate, 19-oxo-proscillaridin-4'-acetate is obtained in the same fashion M.P. 205° C.–210° C. (from ethyl acetate).

(c) 10 grams of proscillaridin-2',3'-acetonide-4'-benzoate obtained from proscillaridin-2',3'-acetonide and benzoyl chloride were cleaved by dissolving in 500 ml. of 0.2 N HCl in tetrahydrofuran (7 hours at 20° C.). After column chromatography on silica gel with the system chloroform/ethyl acetate=2:1, the following was obtained:

3.91 g. of proscillaridin-4'-benzoate (42 percent of theory), $R_f$-value=0.88 in ethyl acetate:amorphous.

EXAMPLE 9

10 g. of proscillaridin were heated with 3 g. of $HBO_2$ in 500 ml. of acetone for a short period until all the proscillaridin was dissolved. The clear solution was cooled, combined with 20 ml. of pyridine and 6 ml. of methoxyacetic acid chloride, and left to stand for three hours at 20° C. The mixture was then combined with 10 ml. of methanol and left to stand for 1 hour at 20° C. for decomposition of excess acid chloride. The batch was then taken up into 200 ml. of ethyl acetate, and shaken twice with five percent of aqueous hydrochloric acid, twice with five percent of aqueous sodium hydroxide, and twice with water. The organic phase was dried with anhydrous sodium sulfate and evaporated to dryness. The crude product was chromatographed on silica gel with the system chloroform:acetone=3:1.

5.66 g. of proscillaridin-3'-methoxy acetate (50 percent of theory) were obtained. $R_f$-value=0.10 in chloroform: ethyl acetate=1:2. The product could not be obtained as crystals.

EXAMPLE 10

5 g. of proscillaridin were boiled together with 1.5 g. of $HBO_2$ in 250 ml. of acetone until all the proscillaridin was dissolved. The clear solution was cooled, combined with 10 ml. of propionic acid anhydride and 10 ml. of absolute pyridine, and left to stand for 2 hours at 20° C. The batch was combined with 20 ml. of methanol and 20 ml. of pyridine and left to stand for an additional three hours at 20° C. for decomposition of excess acid anhydride. After the addition of 500 ml. of ethyl acetate and shaking as in Example 7, the organic phase was dried with anhydrous sodium sulfate and distilled. The crude product obtained was chromatographed over silica gel with the system chloroform:acetone=5:1.

5.25 g. of proscillaridin-3'-propionate (95 percent of theory) were obtained. $R_f$-value=0.28 in chloroform: ethyl acetate=1:2. Crystallization from 50 ml. of ethyl acetate gave 3.43 grams of crystallized proscillaridin-3'-propionate (62 percent of theory). M.P. =226°–243° C.

EXAMPLE 11

5 g. of proscillaridin were boiled briefly with 1.5 g. $HBO_2$ in 250 ml. of acetone until all the proscillaridin was dissolved. The clear solution was cooled, combined with 50 ml. of butyric acid anhydride and 10 ml. of pyridine, and left to stand for 6 hours at 20° C. After working up as in Example 10, the crude product was crystallized from 50 ml. of ethyl acetate.

4.06 g. of crystallized proscillaridin-3'-butyrate (72 percent of theory) were obtained. $R_f$-value=0.44 in chloroform:ethyl acetate=1:2. M.P.=233° C.;241° C.

EXAMPLE 12

5 g. of proscillaridin were boiled briefly with 1.5 g. $HBO_2$ in 250 ml. of acetone until all the proscillaridin was dissolved. The clear solution was cooled, combined with 20 ml. of caproic acid anhydride and 10 ml. of pyridine, and left to stand for 8 hours at 20° C. After working up as in Example 10, the crude product was chromatographed on inactivated silica gel in a column 100 x 6 cm. with the system chloroform:acetone=10:1.

4.58 g. of proscillaridin-3'-caproate (77 percent of theory) were obtained. $R_f$-value=0.62 in chloroform:ethyl acetate=1:2. Crystallization from 15 ml. of ethyl acetate gave 3.02 g. of crystallized proscillaridin-3'-caproate (51 percent of theory). M.P.=124° C.-131° C.

EXAMPLE 13

5 grams of proscillaridin were briefly boiled with 1.5 g. $HBO_2$ in 250 ml. acetone until all the proscillaridin was dissolved. The clear solution was cooled, combined with 30 ml. of capric acid anhydride and 10 ml. of pyridine, and left to stand for 16 hours at 20° C. After working up as in Example 10, the crude product was chromatographed on inactivated silica gel in a column 100 x 6 cm. with the system chloroform:acetone=20:1.

4.40 g. of proscillaridin-3'-caprate (68 percent of theory) were obtained. $R_f$-value=0.73 in chloroform:ethyl acetate=1:2. Crystallization from 15 ml. of n-hexane: ethyl acetate=1:1 gave 3.23 grams of crystallized proscillaridin-3'-caprate (50 percent of theory). M.P. 152° C.-159° C.

EXAMPLE 14

5 g. of proscillaridin were briefly heated with 1.5 g. $HBO_2$ in 250 ml. of acetone until all the proscillaridin was dissolved. The clear solution was cooled, combined with 40 g. of benzoic acid anhydride and 10 ml. of pyridine, and left to stand for 60 hours at 20° C. After working up as in Example 10, the crude product was chromatographed on silica gel with the system chloroform: acetone=10:1.

4.11 g. of proscillaridin-3'-benzoate (69 percent of theory) were obtained. $R_f$-value=0.62 in chloroform:ethyl acetate=1:2. Crystallization from 40 ml. of ethyl acetate gave 3.69 g. of crystallized proscillaridin-3'-benzoate (62 percent of theory). M.P.=246° C.-258° C.

What is claimed is:
1. 19-oxo-proscillaridin-2'-acetate.
2. 19-oxo-proscillaridin-3'-acetate.
3. 19-oxo-proscillaridin-4'-acetate.
4. 19-oxo-proscillaridin-2',3'-diacetate.
5. 19-oxo-proscillaridin-2',4'-diacetate.
6. 19-oxo-proscillaridin-3',4'-diacetate.
7. Proscillaridin-3'-methoxyacetate.
8. Proscillaridin-3'-caproate.
9. Proscillaridin-3'-caprate.
10. Proscillaridin-3'-benzoate.
11. Proscillaridin-4'-benzoate.

References Cited
UNITED STATES PATENTS

| | | | |
|---|---|---|---|
| 3,361,630 | 1/1968 | Steidle | 260—210.5 |
| 3,471,470 | 10/1969 | Heider et al. | 260—210.5 |
| 3,472,836 | 10/1969 | Vogelsang et al. | 260—210.5 |

OTHER REFERENCES

Wartburg: "Helvetica Chimica Act," 47, No. 135, July 1964, pp. 1228-1233.

LEWIS GOTTS, Primary Examiner

J. R. BROWN, Assistant Examiner

U.S. Cl. X.R.

424—182